United States Patent
Petropoulos et al.

(10) Patent No.: US 10,713,247 B2
(45) Date of Patent: Jul. 14, 2020

(54) EXECUTING QUERIES FOR STRUCTURED DATA AND NOT-STRUCTURED DATA

(71) Applicant: Amazon Technologies, Inc., Seattle, WA (US)

(72) Inventors: Michail Petropoulos, San Francisco, CA (US); Ippokratis Pandis, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 15/476,273

(22) Filed: Mar. 31, 2017

(65) Prior Publication Data
US 2018/0285418 A1  Oct. 4, 2018

(51) Int. Cl.
*G06F 16/2453* (2019.01)
*G06F 16/33* (2019.01)
*G06F 16/2458* (2019.01)

(52) U.S. Cl.
CPC .... *G06F 16/24542* (2019.01); *G06F 16/2471* (2019.01); *G06F 16/3332* (2019.01)

(58) Field of Classification Search
CPC ............... G06F 16/24542; G06F 16/2471
See application file for complete search history.

(56) References Cited

U.S. PATENT DOCUMENTS

| | | | |
|---|---|---|---|
| 8,924,328 B1 * | 12/2014 | Kozlovsky | H04L 41/0816 703/2 |
| 2008/0177770 A1 * | 7/2008 | Friedlander | G06F 21/6227 |
| 2011/0314019 A1 * | 12/2011 | Jimenez Peris | G06F 9/5066 707/737 |
| 2013/0091122 A1 | 4/2013 | Salch et al. | |
| 2013/0117234 A1 * | 5/2013 | Schreter | G06F 16/2358 707/674 |
| 2013/0173643 A1 * | 7/2013 | Ezzat | G06Q 10/06 707/756 |
| 2015/0169655 A1 * | 6/2015 | Gupta | G06F 16/221 707/602 |
| 2015/0254561 A1 * | 9/2015 | Singal | G06F 16/24542 707/713 |

(Continued)

OTHER PUBLICATIONS

International Search Report and Written Opinion from PCT/US2018/025337, dated May 23, 2018, Amazon Technologies Inc., pp. 1-12.

(Continued)

*Primary Examiner* — Hosain T Alam
*Assistant Examiner* — Anthony G Gemignani
(74) *Attorney, Agent, or Firm* — Robert C. Kowert; Kowert, Hood, Munyon, Rankin & Goetzel, P.C.

(57) ABSTRACT

Queries received at a query engine may be executed for structured data and not-structured data. A query execution plan may be generated for the query that includes stateless operations to apply the query to the not-structured data at remote query processing engines. The remote query processing engines may perform the stateless operations and return results to the query engine. The query engine may generate a result for the query based on the results received from the remote query engine as well as results determined as part of applying the query to structured data. The result to the query may be returned.

20 Claims, 13 Drawing Sheets

(56) References Cited

U.S. PATENT DOCUMENTS

| | | | | |
|---|---|---|---|---|
| 2015/0331910 A1* | 11/2015 | Srinivasan | ............. | G06F 16/27 |
| | | | | 707/706 |
| 2016/0004751 A1* | 1/2016 | Lafuente Alvarez | .... | G06N 5/04 |
| | | | | 707/718 |
| 2016/0267119 A1* | 9/2016 | Teletia | ................ | G06F 16/2272 |
| 2016/0335318 A1* | 11/2016 | Gerweck | ............. | G06F 16/2282 |
| 2016/0371355 A1* | 12/2016 | Massari | .................. | G06F 16/25 |
| 2017/0031988 A1* | 2/2017 | Sun | .................. | G06F 16/24554 |

OTHER PUBLICATIONS

Lei Chang et al "HAWQ: A Massively Parallel Processing SQL Engine in Hadoop", Proceedings of the 2014 ACM Signmod International Conference on Management of Data, SIGMOD, dated Jan. 1, 2014, pp. 1223-1234.

Unkown "Claudera Introduction" dated May 27, 2016, Retrieved from Internet: URL:https://www.aspsys.com/images/solutions/storage-solutions/big-data-hadoop/cloudera%20introduction.pdf, pp. 1-83.

Marcel Kornacker et al "Impala: A Modern, Open-Source SQL Engine for Hadoop", dated Jan. 7, 2015, pp. 1-10.

\* cited by examiner

```
SELECT                                            810
    LOGDATA.* AS EVENT_DATA
    LOGDATA.USERNAME
    USERS.NAME
FROM                              not-structured
    LOGDATA                        data 820
WHERE
    LOGDATA.TIMESTAMP BETWEEN 2017-01-01 AND
        2017-01-08
INNER JOIN                        structured data
    USERS ON                           830
    LOGDATA.USERNAME = USERS.NAME
```

EXECUTING QUERIES FOR STRUCTURED DATA AND NOT-STRUCTURED DATA

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management solution that satisfies most storage and processing needs without excluding some types or formats of data. For example, structured data may not be processed using the same data management and storage solutions as data that is not-structured. Therefore, data often becomes stored or distributed across different locations, in different formats, requiring multiple different systems to manage or access data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of executing queries for structured data and data that is not-structured are described herein. Data is generated, collected, and stored in diverse locations and formats, in one embodiment. Submitting queries for different types of data to a common query engine can provide a single interface for the management and access of data without requiring data to be transformed into a common format, in one embodiment. For example, a Structured Query Language (SQL) query can be submitted to the query engine that searches either structured data or data that is not-structured or both structured data and data that is not-structured, in one embodiment, providing a common query language executable with respect to the different types of data. In this way, clients of the common query engine can focus on developing applications or use cases for data without regard to the underlying format of the data.

Figure 1:
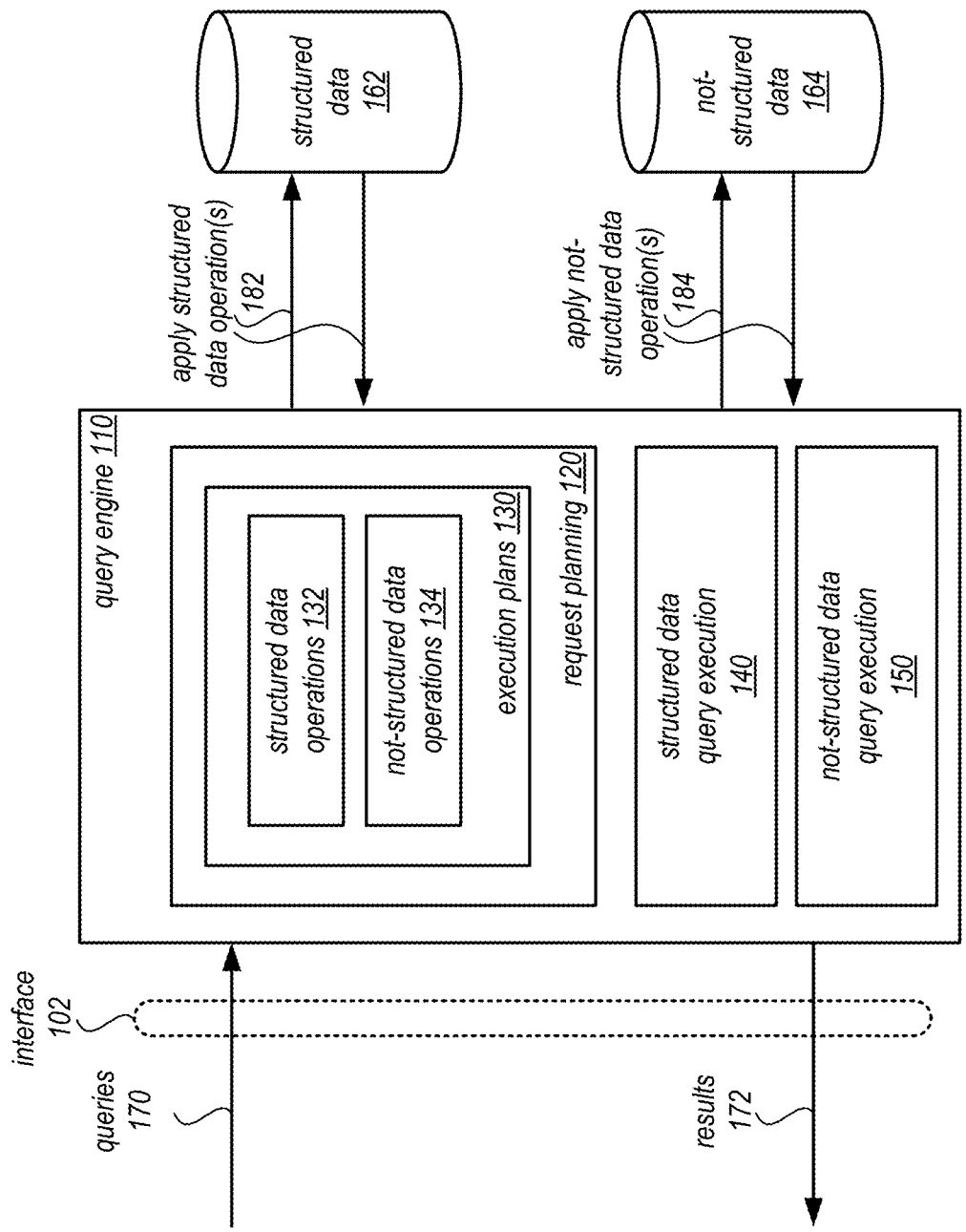
FIG. 1 illustrates a logical block diagram of executing queries for data that is structured and data that is not-structured, according to some embodiments.

FIG. 1 illustrates a logical block diagram of executing queries for data that is structured and data that is not-structured, according to some embodiments. Query engine 110 may be a query engine that can access and process queries 170 with respect to different types of data, in one embodiment. For example, as illustrated in FIG. 1, query engine 110 can access structured data 162 and not-structured data 164. Query engine 110 may implement an interface 102 that supports queries according to public or common query specification languages, such as SQL, or may receive queries formatted according to proprietary or custom query languages, such as Splunk Processing Language (SPL™)—a proprietary query processing language developed by Splunk, Inc. of San Francisco, Calif., in some embodiments. In at least some embodiments, query engine 110 may translate queries received in different query language formats into another query language format for execution (e.g., translate an SPL query into a SQL query).

Query engine 110 may implement request planning 120 to execute queries with respect to both structured data 162 and not-structured data 164, in some embodiments. For example, a SQL query may be received that specifies at least one query predicate directed to structured data 162 and another query predicate directed to not-structured data 164, in one embodiment. Request planning 120 may generate an execution plan, such as execution plan 130, with both structured data operations 132 and not-structured data operations 134 in order to execute such a SQL query. Not-structured data operations may be stateless operations, in at least some embodiments, so that a query engine executing the operation may execute the operation in stateless fashion, without preserving state for the operation (e.g., across multiple nodes or beyond the execution of the of the stateless operations) and/or may treat the operation as individual transaction or operation with reference to any other transaction or operation. Other queries that are received may be directed to either structured data 162 or not-structured data 164 and appropriate structured data operations 132 or not-structured data operations 134 may be determined and included in an execution plan 130 generated by request planning 120, in different embodiments. In this way, execution plan generation may be performed to optimize and select execution plans 130 that account for process queries with respect to different types of data, in one embodiment.

Query engine 110 may implement structured data query execution 140 to perform structured data operations 132, applying 182 the structured data operations to structured data 162 (e.g., scans, merges, joins, etc.), in some embodiments. Query engine 110 may implement not-structured data query execution 150 to perform not-structured data operations 134, applying not-structured data operations 134 (e.g., scans, sequence analysis, full text search, joins, etc.). In some embodiments, not-structured data query engine 150 may provide results from the application 184 of not-structured data operations to structured data query execution for formatting and/or reporting as results 172. In this way, results 172 may be presented in a format as if not-structured data 164 were structured. Not-structured data 150 may be implemented as a remote, distributed, or otherwise separate query engine or service that receives and applies not-structured data operations 134 generated and executed according to execution plan 130, in some embodiments.

Structured data 162 may be data that is stored according to a pre-defined data model, such as relational data model, in one embodiment, that can be validated with respect to structured data. In one embodiment, structured data 162 may be stored in different types of formats, such as row-oriented format (e.g., where rows of data are stored together in a single block of persistent storage) or column-oriented format (e.g., where columns of data are stored together in a single block of persistent storage). Not-structured data 164 may be data that is semi-structured, such as log records, or unstructured, such as text data, or any other data that is not fully-structured, in one embodiment.

Please note that the previous description of executing queries for data that is structured and data that is not-structured is a logical illustration and thus is not to be construed as limiting as to the implementation of a query engine, or other illustrated features such as request planning, structured data query execution, not-structured data query execution, or data stores for structured data or not-structured data.

This specification begins with a general description of a provider network that implements structured data processing that executes queries for data that is structured and data that is not-structured. Then various examples of a structured data processing service, including different components/modules, or arrangements of components/module that may be employed as part of implementing the techniques are discussed. A number of different methods and techniques to implement executing queries for data that is structured and data that is not-structured are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
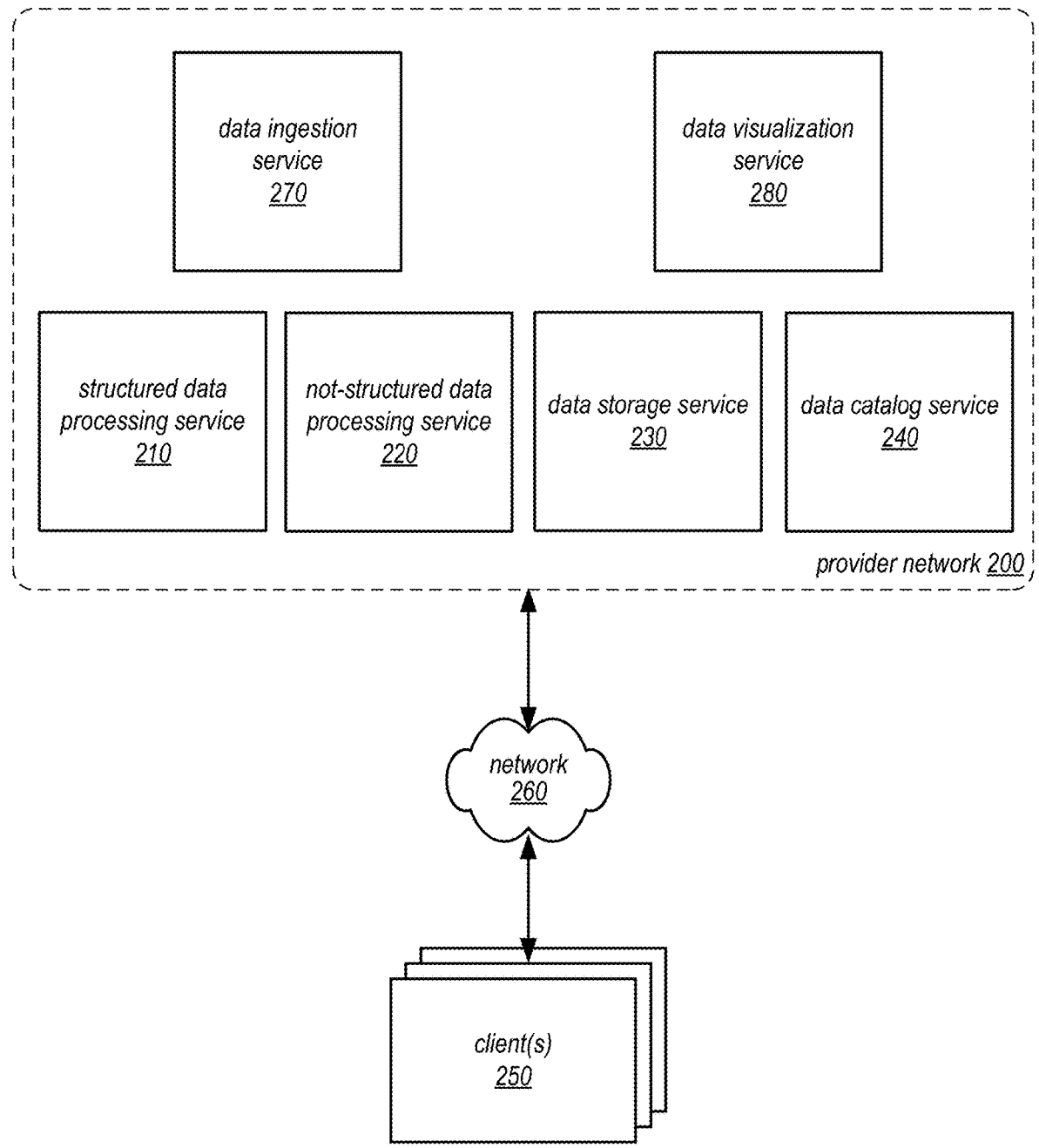
FIG. 2 is a logical block diagram illustrating a provider network offering structured data processing services that process queries for data that is structured and data that is not-structured, according to some embodiments.

FIG. 2 is a logical block diagram illustrating a provider network offering structured data processing services that process queries for data that is structured and data that is not-structured, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 13), needed to implement and distribute the infrastructure and storage services offered by the provider network 200, in one embodiment. In some embodiments, provider network 200 may implement various computing resources or services, such as structured data processing service(s) 210, (e.g., a map reduce service, a data warehouse service, and other large scale data processing services or database services), not-structured data processing service 220, data storage service 230 (e.g., object storage services or block-based storage services that may implement a centralized data store for various types of data), data catalog service 240 (which may store schema information and other metadata for data stored in data storage service 230 or processed by structured data processing service 210 or not-structured data processing service 220), data ingestion service 270, data visualization service 280, and/or any other type of network based services (which may include a virtual compute service and various other types of storage, processing, analysis, communication, event handling, visualization, and security services not illustrated), in one embodiment.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below, in one embodiment. In various embodiments, the functionality of a given system or service component (e.g., a component of structured data processing service 210, not-structured data processing service 220, data storage service 230, or data catalog service 240) may be implemented by a particular node or may be distributed across several nodes. In some embodiments, a given node may implement the functionality of more than one service system component (e.g., more than one data store component).

Structured data processing services 210 may be various types of data processing services that perform general or specialized data processing functions (e.g., analytics, big data querying, or any other type of data processing operation) over data that is fully structured data, in some embodiments. For example, in at least some embodiments, structured data processing services 210 may include various types of database services (e.g., relational) for storing, querying, and updating data. Such services may be enterprise-class database systems that are scalable and extensible. Queries may be directed to a database in structured data processing service(s) 210 that is distributed across multiple physical resources, as discussed below with regard to the example data warehouse service FIG. 3, and the database system may be scaled up or down on an as needed basis, in one embodiment. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Not-structured data processing service 220, as discussed in more detail below with regard to FIGS. 3-11, may provide a service supporting that can execute operations to apply a query to data that is not-structured according to operations identified and provided to not-structured data processing service 220, in some embodiments. Not-structured data processing service may access the data that is not-structured in storage, such as data objects of unstructured or semi-structured data in data storage service 230, in one embodiment. Instead of reformatting data that is not-structured into a format that is structured for operation directly by structured data processing service 210 and moving the reformatted data from data storage service(s) 230 into the structured data processing service(s) 210, not-structured data processing service 220 may efficiently execute operations determined by structured data processing service 210 on behalf of a query received at structured data processing service so that structured data processing service can support queries directed to structured data, data that is not-structured, or a combination of structured data and data that is not-structured, in one embodiment. Not-structured data processing service 220 may then provide results of the operations to structured data processing service 210 which may incorporate, format, and otherwise provide results for the query, in some embodiments.

By relying upon structured data processing service 210 to determine operations to perform to execute queries, not-structured data processing service 220 may be implemented as a dynamically scalable and stateless data processing service that is fault tolerant without the need to support complex query planning and execution for multiple different data formats. Instead, not-structured data processing service 220 may offer a set of data processing capabilities to access data stored in a wide variety of data formats that is not fully structured, such as log records, (which may not be supported by different structured data processing service 210) that can be programmatically initiated on behalf of another data processing client, such as data processing service 210. In some embodiments, not-structured data processing service may perform ingestion or pre-processing of data that is not-structured as it is received for storage (e.g., in data storage service 230), and store metadata for the not-structured data in data catalog service 240.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, not-structured data processing service 220 may access data objects stored in data storage services via the programmatic interfaces to perform operations to execute queries received at structured data processing service.

Data catalog service 240 may provide a catalog service that ingests, locates, and identifies data stored on behalf of clients in provider network 200 across the various data storage services 230. For example, data catalog service may identify a customer of provider network on whose behalf a storage container in storage service 230 is storing objects. In at least some embodiments, data catalog service 240 may direct the transformation of data ingested in one data format into another data format. For example, data may be ingested into a data storage service 310 as single file or semi-structured set of data (e.g., JavaScript Object Notation (JSON)). In at least some embodiments, metadata for data that is not-structured may be stored as part of data catalog service 240, including information about data types, names, delimiters of fields, and/or any other information to access the data that is not-structured, including metadata generated as part of an ingestion process executed by not structure data processing service 220, as discussed below.

In at least some embodiments, provider network 200 may implement data ingestion service 270 to receive data from data sources, including not-structured data, extract schema information for the not-structured data (where possible), and store the schema information (e.g., as part of data catalog service 240), as discussed in detail below with regard to FIGS. 4 and 5. In some embodiments, provider network 200 may implement data visualization service 280 which may provide graphical or command line user interfaces for clients to execute queries (e.g., including queries directed to structured and not-structured data), visualize the results of queries (e.g., as different graphs, charts, or other display options, direct the generation and storage of reports, as well as provide dashboards for monitoring based on queries, query execution status, or any other query related features). In some embodiments, visualization service 280 may serve as a front-end for structured data processing service 210 and/or not-structured data processing service 220, so that queries submitted via visualization service 280 are directed to the appropriate processing service.

Generally speaking, clients 250 may encompass any type of client that can submit network-based requests to provider network 200 via network 260, including requests for storage services (e.g., a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230).

Clients 250 may convey network-based services requests (e.g., access requests to read or write data may be directed to data in data storage service(s) 230, queries to structured data processing service(s) 220, or to interact with data catalog service 240) to and receive responses from provider network 200 via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
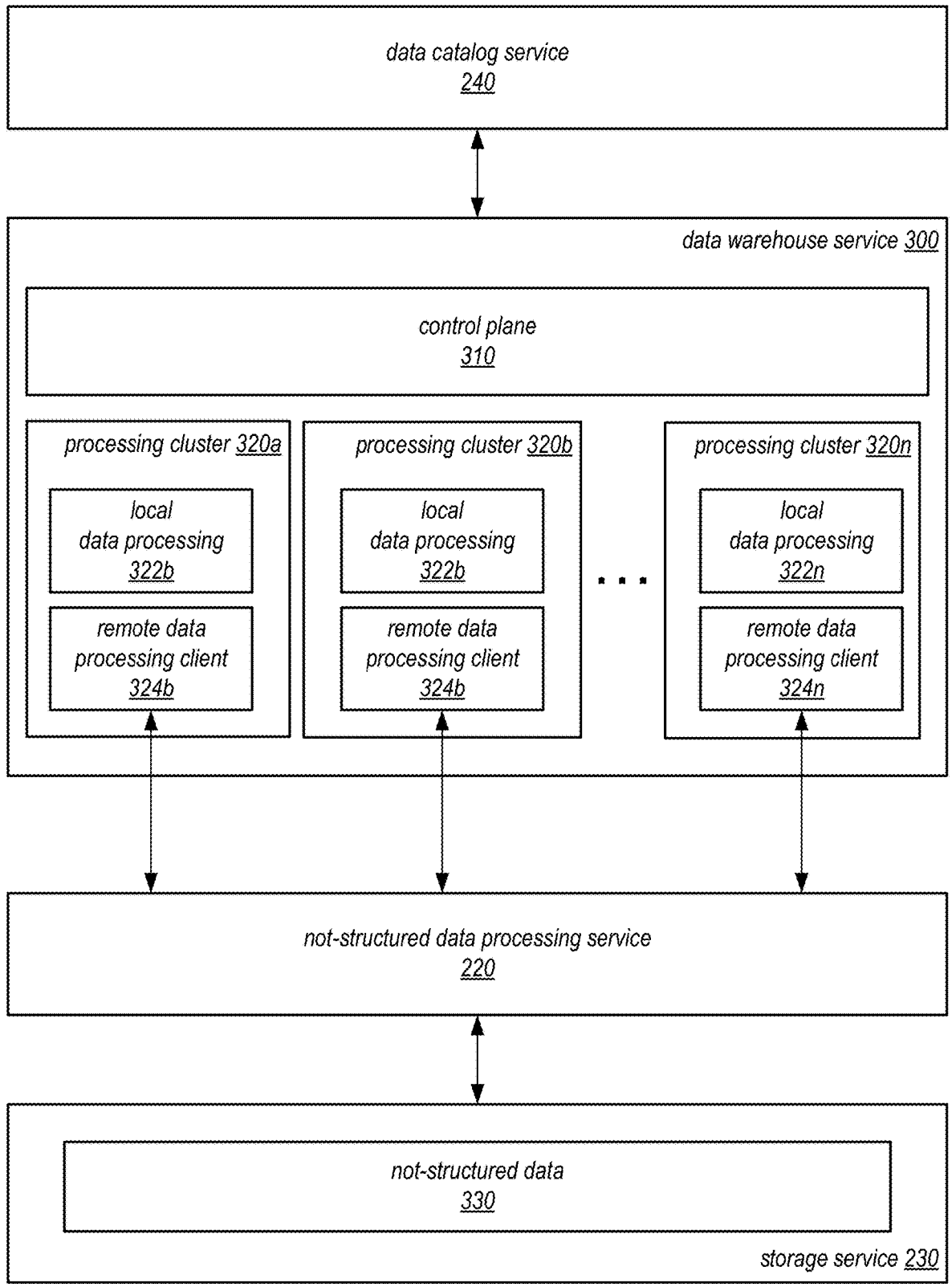
FIG. 3 is a logical block diagram of a data warehouse service that utilizes a not-structured data processing service to execute queries for data that is structured and data that is not-structured, according to some embodiments.

In at least some embodiments, structured data processing service 220 may be a data warehouse service. FIG. 3 is a logical block diagram of a data warehouse service that utilizes a not-structured data processing service to execute queries for data that is structured and data that is not-structured, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") data warehouse system. However, various versions of the components discussed below as may be equally adapted to implement embodiments for various other types of database or data warehouse systems, such as row-oriented database systems. Therefore, the following examples are not intended to be limiting as to various other types or formats of structured data that may be stored, accessed, or otherwise managed by a data warehouse, like data warehouse service 300.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 13, in some embodiments. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300, in one embodiment.

As discussed above, various clients (or customers, organizations, entities, or users) may wish to store and manage data using a data warehouse service like data warehouse service 300. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Queries may be directed to data that is locally hosted as part of data warehouse service 300 or stored elsewhere that is fully structured data or queries directed to data that is not-structured, such as log records, event data, or machine generated data stored in storage service 230. In some embodiments, data warehouse service may receive updates from or access metadata for queries received at data catalog service in order to generate a query execution plan based, at least in part on metadata, such as schema information, for a data set (of structured or not-structured data). Multiple users or clients may access a processing cluster to obtain data warehouse services, in one embodiment. In at least some embodiments, a data warehouse service 300 may provide network endpoints to the clusters which allow the clients to send requests and other messages directly to a particular cluster. Network endpoints, for example may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters, such as processing clusters 320*a*, 320*b*, through 320*n*, hosted by the data warehouse service 300 may provide an enterprise-class database query and management system that allows users to send data processing requests to be executed by the clusters 320, such as by sending a data processing request to a cluster control interface implemented by the processing clusters, in some embodiments. Processing clusters 320 may perform data processing operations with respect to data stored locally in a processing cluster, as well as remotely stored data (which may not be structured data), in one embodiment. For example, data storage service 230 of provider network 200 may store data that is not-structured 330 as one or more objects in an object-based data store, in one embodiment. Queries sent to a processing cluster 320 may be directed to local data stored in the processing cluster and/or remote data, such as not-structured data 330, in some embodiments. Therefore, processing clusters may implement local data processing, such as local data processing 322*a*, 322*b*, and 322*c* (discussed below with regard to FIG. 5) to plan and execute the performance of queries with respect to local data in the processing cluster, as well as a remote data processing client, such as remote data processing clients 324*a*, 324*b*, and 324*c*, to direct execution of different operations determined as part of the query plan generated at the processing cluster that are assigned to not-structured data processing service with respect to processing not-structured data 330, in one embodiment.

Scaling clusters 320 may allow users of data warehouse service 300 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. Control plane 310 may direct scaling operations to right-size a processing cluster 320 for efficiently processing queries.

Figure 4:
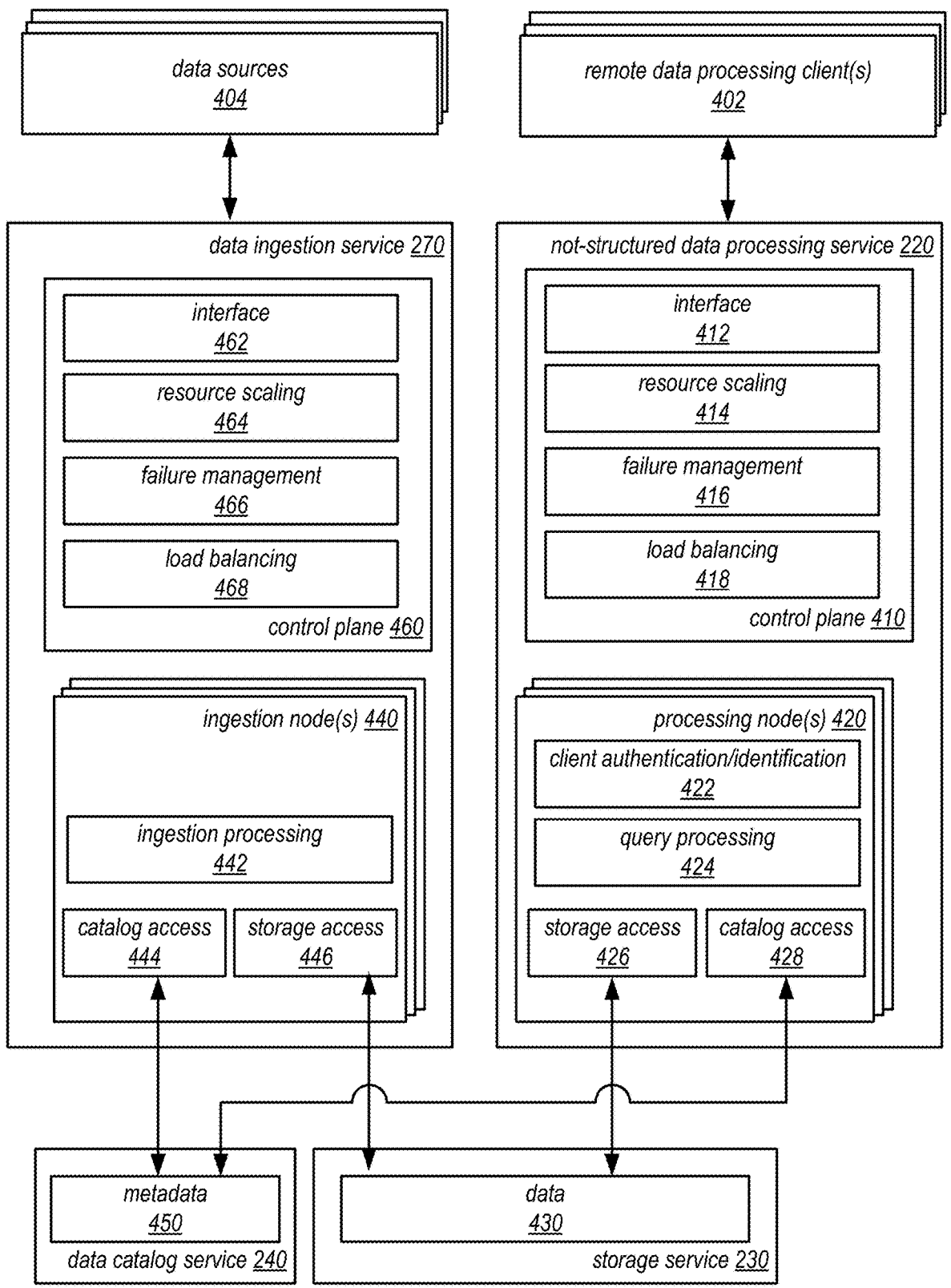
FIG. 4 is a logical block diagram illustrating a not-structured data processing service and data ingestion service, according to some embodiments.

FIG. 4 is a logical block diagram illustrating a not-structured data processing service and data ingestion service, according to some embodiments. As noted above in FIG. 2, not-structured data processing service 220 may receive requests to perform stateless processing operations with respect to not-structured data 430 stored in a data storage service, such as storage service 230. Processing requests may be received from a client, such as remote data processing client(s) 402 (which may be a structured data processing service 210, like data warehouse service 300 or another data processing client, such as a database engine/cluster or map reduce cluster implemented outside of provider network 200 and communicating with not-structured data processing service 220 in order to process queries with respect to data stored within provider network 200 in a data storage service 230 or to process data stored outside of provider network 200 (when the data is made accessible to not-structured data processing service 220).

Not-structured data processing service 220 may implement a control plane 410 and multiple processing node(s) 420 to execute processing requests received from remote data processing client(s) 402, in some embodiments. Control plane 410 may arbitrate, balance, select, or dispatch work to different processing node(s) 420, in various embodiments. For example, control plane 410 may implement interface 412 which may be a programmatic interface, such as an application programming interface (API), that allows for requests to be formatted according to the interface 412 to programmatically invoke operations or ingestion processing. In some embodiments, the API may be defined to allow operation requests defined as objects of code generated at and sent from remote data processing client(s) 402 (based on a query plan generated at remote data processing client(s) 402) to be compiled or executed in order to perform the assigned operations at not-structured data processing service 220.

In some embodiments, not-structured data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme, in one embodiment. A round-robin load balancing scheme, for instance, may be used to ensure that remote data processing requests are fairly distributed amongst processing node(s) 420, in one embodiment. However, various other load-balancing schemes may be implemented in other embodiments. As not-structured data processing service 220 may receive many remote data processing requests from multiple remote data processing client(s) 402, load balancing 418 may ensure that incoming requests are not directed to busy or overloaded processing node(s) 420.

Not-structured data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 or to processing received remote data processing requests. Similarly, the number of processing node(s) 420 could be reduced by resource scaling 414 in the event that the request rate or workload of processing node(s) falls below the under-utilization threshold.

Not-structured data processing service 220 may also implement failure management 416 to monitor processing node(s) 420 and other components of not-structured data processing service 220 for failure or other health or performance states that may need to be repaired or replaced, in some embodiments. For example, failure management 416 may detect when a processing node fails or becomes unavailable (e.g., due to a network partition) by polling processing node(s) 420 to obtain health or performance status information, in one embodiment. Failure management may initiate shutdown or halting of processing at failing processing node(s) 420 and provision replacement processing node(s) 420, in one embodiment.

Figure 13:
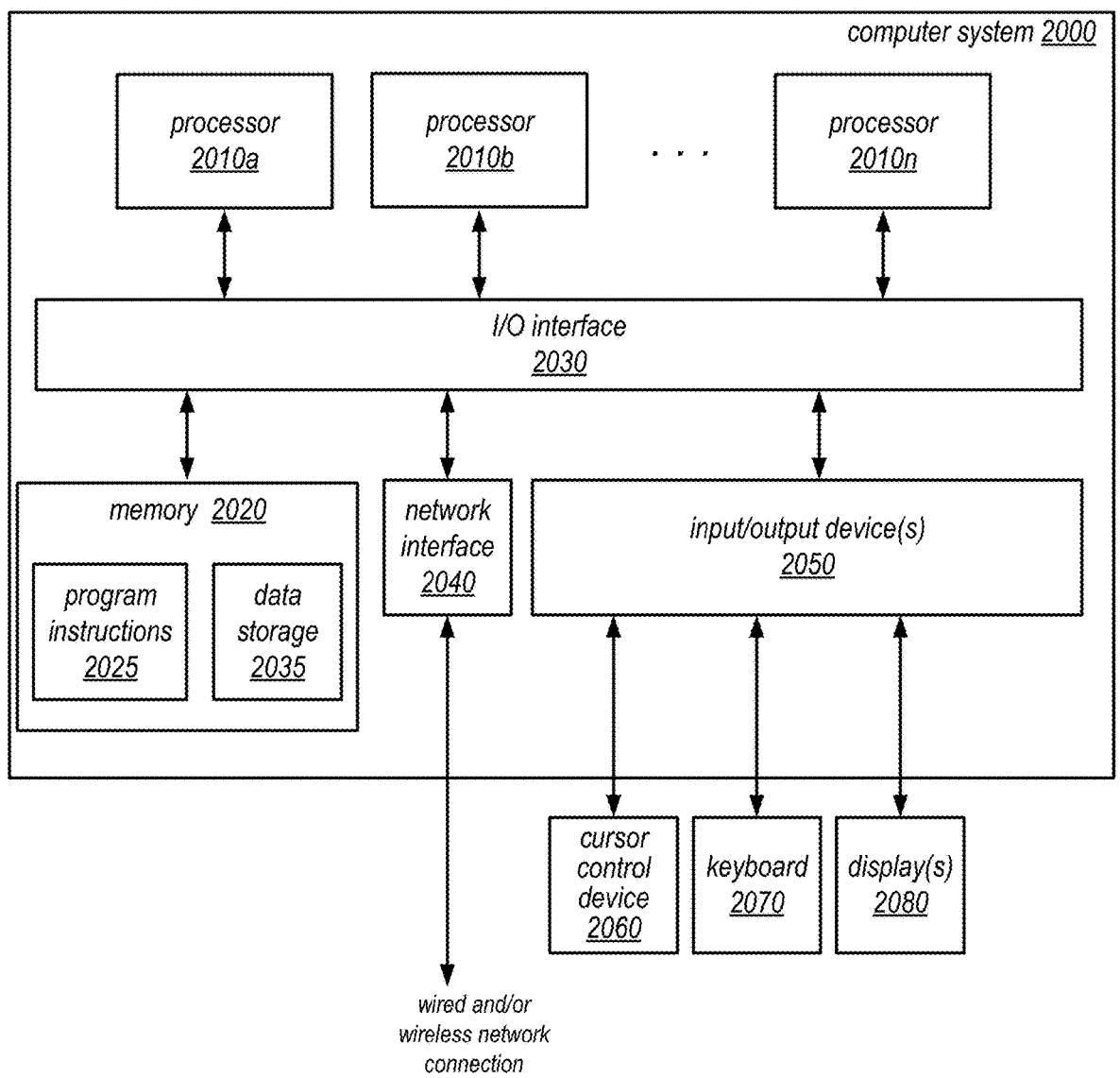
FIG. 13 illustrates an example system to implement the various methods, techniques, and systems described herein, according to some embodiments.

Processing node(s) 420 may be implemented as separate computing nodes, servers, or devices, such as computing systems 2000 in FIG. 13, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 422 to determine whether a remote data processing client 402 has the right to access data 430 in storage service 230. For example, client authentication/identification 422 may evaluate access credentials, such as a username and password, token, or other identity indicator by attempting to connect with storage service 230 using the provided access credentials. If the connection attempt is unsuccessful, then the data processing node 420 may send an error indication to remote data processing client 402.

Processing node(s) 420 may implement query processing 424 which may perform multiple different processing operations that may be found in standard query processing languages for structured data, such as SQL, performed over various types of not-structured data, in some embodiments. Query processing 424 may support sequence analysis operations (e.g., for log records), in one embodiment. Query processing 424 may support full-text search as an operator in query processing languages, such as SQL, in order to include full-text search with other query language constructs, in some embodiments. For instance, a SQL query may be received that joins predicates for structured data with data found in not-structured data using a full-text search operation. Query processing 424 may detect, determine, or identify schema information for data (e.g., data types for data within a log record) and may pass the schema information back to remote data processing client(s) when providing results, in some embodiments.

In at least some embodiments, query processing 424 may implement a late-binding schema for not-structured data when performing operations. For example, query processing 424 may apply an extraction rule or other retrieval rule to obtain or otherwise abstract data from locations (e.g., fields) within not-structured data, in one embodiment. Extraction or retrieval rules can include criteria to evaluate when apply the rule, such as a regular expression of characters for full text search, in one embodiment. Extraction rules applied by query processing 424 may be determined by ingestion node(s) 440 as part of ingestion processing 442, defined or updated by clients or users (e.g., of structured data processing service 210, data catalog service 240), or determined as not-structured data is accessed when performing an operation, in some embodiments. In this way, "raw data" in not-structured data can be treated as semi-structured or structured data when performing operations to execute a query, in one embodiment.

Processing node(s) 420 may implement storage access 426 to format, generate, send and receive requests to access data 430 in storage service 230. For example, storage access 426 may generate requests to obtain data according to a programmatic interface for storage service 430. In some embodiments, other storage access protocols, such as internet small computer interface (iSCSI), may be implemented to access data 430.

Data ingestion service 270 may implement a control plane 460 and multiple ingestion nodes 440 to ingest data received (e.g., as part of data streams) from different data sources 404, in some embodiments. Control plane 460 may arbitrate, balance, select, or dispatch work to different ingest node(s) 440, in various embodiments. For example, control plane 460 may implement interface 462 which may be a programmatic interface, such as an application programming interface (API), that allows for requests to be formatted according to the interface 462 to programmatically invoke ingestion processing. In some embodiments, data ingestion service 280 may implement load balancing 468 to distribute remote processing requests across different ingestion node(s) 440. For example, an ingestion request received via interface 462 may be directed to a network endpoint for a load-balancing component of load balancing 468 (e.g., a load balancing server or node) which may then dispatch the request to one of ingestion node(s) 440 according to a load balancing scheme, in one embodiment. A round-robin load balancing scheme, for instance, may be used to ensure that ingestion requests are fairly distributed amongst ingestion node(s) 440, in one embodiment. However, various other load-balancing schemes may be implemented in other embodiments. As data ingestion service 270 may receive data from many different data sources 404, load balancing 468 may ensure that incoming requests are not directed to busy or overloaded ingestion node(s) 440.

Data ingestion service 270 may also implement resource scaling 464. Resource scaling 464 may detect when the current request rate or workload upon a current number of ingestion node(s) 440 exceeds or falls below over-utilization or under-utilization thresholds for ingestion nodes. In response to detecting that the request rate or workload exceeds an over-utilized threshold, for example, then resources scaling 464 may provision, spin up, activate, repurpose, reallocate, or otherwise obtain additional ingestion node(s) 440 for processing received data ingestion requests. Similarly, the number of ingestion node(s) 440 could be reduced by resource scaling 464 in the event that the request rate or workload of ingestion node(s) falls below the under-utilization threshold.

Data ingestion service 280 may also implement failure management 466 to monitor ingestion node(s) 440, and other components of not-structured data processing service 220 for failure or other health or performance states that may need to be repaired or replaced, in some embodiments. For example, failure management 416 may detect when a processing node fails or becomes unavailable (e.g., due to a network partition) by polling processing node(s) 420 to obtain health or performance status information, in one embodiment. Failure management may initiate shutdown or halting of processing at failing processing node(s) 420 and provision replacement ingestion node(s) 440, in one embodiment.

Ingestion node(s) 440 may be implemented as separate computing or compute nodes, servers, or devices, such as computing systems 2000 in FIG. 13, to perform ingestion operations on data received from data source(s) 404. For example, data sources 404 may provide various kinds of semi-structured or unstructured data, including log records and machine-generated data or events, in one embodiment. Ingestion node(s) 440 may connect to data source(s) 404 using a connector (not illustrated) specific to the data source, including connectors for syslog, files, transactional databases, ingestion and messaging systems, or any other data source that may transfer data as a stream or batch to storage service for eventual querying using structured data processing service 210. Ingestion node(s) 440 may implement ingestion processing 442 to perform various operations, including schema extraction for received data, index generation, and/or reformatting, as discussed below with regard to FIG. 5. Metadata (e.g., extracted schema, index data, and/or other information including notifications of data arrivals) may be stored by ingestion node(s) 440 via catalog access 444 as metadata 450 in data catalog service 240. Ingestion node(s) 440 may implement storage access 446 to format and/or store ingested data as one or more objects in data 430 in storage service 230, in one embodiment. For example, storage access 446 may generate requests to obtain data according to a programmatic interface for storage service 230. In some embodiments, other storage access protocols, such as internet small computer interface (iSCSI), may be implemented to access data 430

Figure 5:
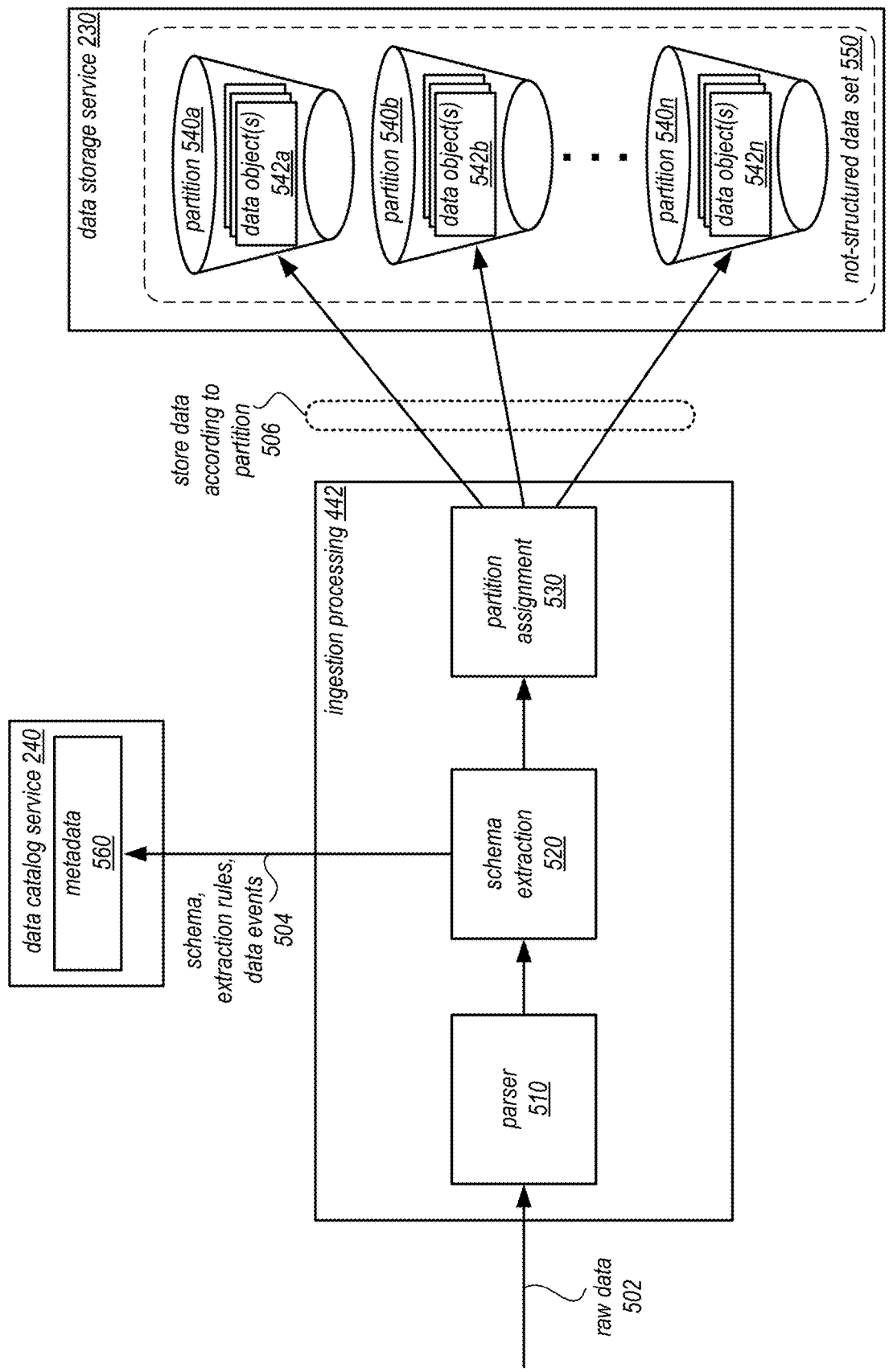
FIG. 5 is a logical block diagram illustrating ingestion for not-structured data processing service, according to some embodiments.

FIG. 5 is a logical block diagram illustrating ingestion for not-structured data processing service, according to some embodiments. Ingestion processing 442 may receive raw data 502 from various data sources 404 (e.g., via a source specific connector or standard data transfer protocol), in one embodiment. Raw data 502 may include semi-structured, unstructured, or any other type of data that is not fully-structured, in one embodiment—although portions of raw data 502 may be fully structured in other embodiments. Ingestion processing may implement parser 510 in order to interpret raw data. For example, parser 510 may process raw data as stream searching for delimiters, headers, or other information indicating the beginning and ending of discrete objects in raw data 502 (e.g., log records). Different types of raw data 502 may be parsed according to different techniques so that in some embodiments parser 510 may be implemented as multiple parallel parsing components operating on a stream in parallel to discover which parsing technique correctly interprets raw data 502. Parser 510 may organize the raw data 502 into events or data objects, in one embodiment.

Ingestion processing 442 may implement schema extraction 520, in various embodiments. For example, schema extraction may recognize data source types, a timestamp, data types, columns, fields, or other locations within data objects that may conform to a schema. In some embodiments, schema extraction 520 may generate extraction or retrieval rules to remove data from the data object according to the extracted schema information (e.g., where in the data object a particular field is located). Schema extraction 520 may also recognize the arrival of a certain type of data for which a continuous query has been specified in order to provide a data event notification (which may trigger the execution of a query at structured data processing service 210 via a notification from data catalog service 240 to structured data processing service 210). Schema extraction 520 may provide the schema, extraction rules, data events, and other metadata 504 for storage in data catalog service 240 as part of metadata 560 for not-structured data set 550. In some embodiments, schema extraction 520 may provide or generate an index based on information extracted for data objects (e.g., based on timestamp values determined for each data object).

Ingestion processing 442 may implement partition assignment 530 to determine which partition 540 of not-structured data set 550 to store the data objects 542 in, in some embodiments. For example, partition assignment 530 may generate a hash value (e.g., based on a timestamp or other unique value that may be determined for each data object, such as the order in which the data objects are parsed by parser 510), in one embodiment. Partition assignment 530 may then implement a consistent hashing technique to assign the data objects based on the generated hash value. Other partitioning schemes, including round robin or other distribution schemes may be implemented to select partition assignments, in some embodiments. The data objects may be stored 506 according to the partition assignment in not-structured data set 550 in data storage service 230. Each partition may be stored as collection of objects, such as buckets for partitions 540a, 540b and 540n storing data object(s) 542a, 542b, and 542n respectively, in one embodiment.

Figure 6:
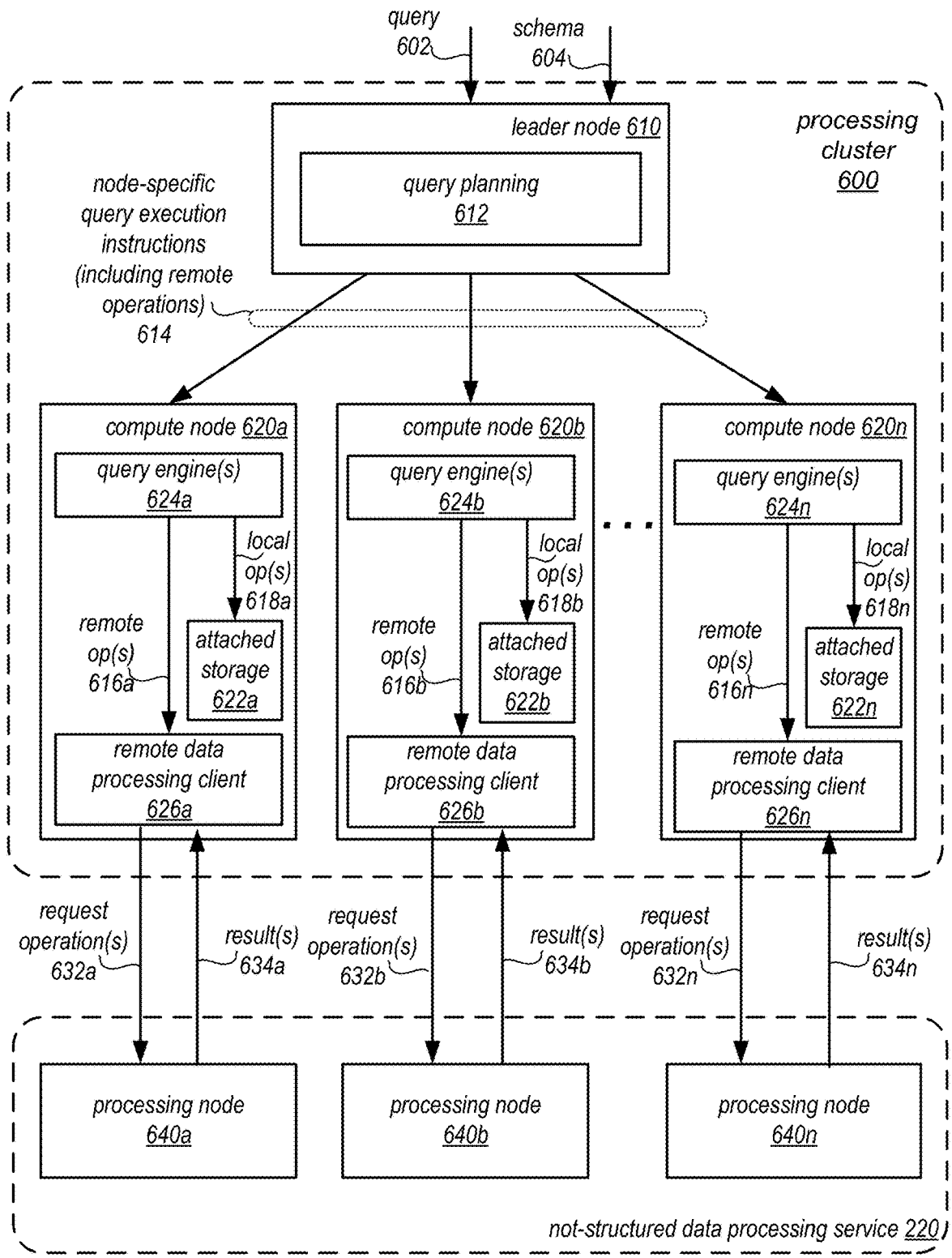
FIG. 6 is a logical block diagram illustrating an example processing cluster of a data warehouse service using a not-structured data processing service to perform operations at a remote data store to execute a query, according to some embodiments.

FIG. 6 is a logical block diagram illustrating an example processing cluster of a data warehouse service using a not-structured data processing service to perform operations at a remote data store to execute a query, according to some embodiments. Processing cluster 600 may be data warehouse service cluster, like processing clusters 320 discussed above with regard to FIG. 3, or another processing cluster that distributes execution of a query among multiple processing nodes, in one embodiment. As illustrated in this example, a processing cluster 600 may include a leader node 610 and compute nodes 620a, 620b, and 620n, which may communicate with each other over an interconnect (not illustrated), in one embodiment. Leader node 610 may implement query planning 612 (discussed in detail below with regard to FIG. 7) to generate query plan(s) and instructions 614 for executing queries on processing cluster 600 that perform tiered data processing, in one embodiment. As described herein, each node in a processing cluster 600 may include attached storage, such as attached storage 622a, 622b, and 622n, on which a database (or portions thereof) may be stored on behalf of clients (e.g., users, client applications, and/or storage service subscribers), in one embodiment.

Note that in at least some embodiments, query processing capability may be separated from compute nodes, and thus in some embodiments, additional components may be implemented for processing queries. Additionally, it may be that in some embodiments, no one node in processing cluster 600 is a leader node as illustrated in FIG. 6, but rather different nodes of the nodes in processing cluster 600 may act as a leader node or otherwise direct processing of queries to data stored in processing cluster 600, in one embodiment. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 600 may be implemented as part of a data warehouse service, as discussed above with regard to FIG. 3, or another data processing service(s) 210. Leader node 610 may manage communications with clients, such as clients 260 discussed above with regard to FIG. 2, in one embodiment. For example, leader node 610 may be a server that receives a query 602 from various client programs (e.g., applications) and/or subscribers (users), then parses them and develops an execution plan (e.g., query plan(s)) to carry out the associated database operation(s), which may also be based on schema data 604 received from data catalog service 240 in some embodiments). In at least some embodiments, query 602 may be a continuous query triggered as a result of a data event detected at ingestion processing 442. In this way, a query can be defined and repeatedly executed by structured data processing service 210 each time a specified data event for the query is detected.

Leader node 610 may develop the series of steps necessary to obtain results for the query, in one embodiment. Query 602 may be directed to data that is stored both locally within processing cluster 600 (e.g., at one or more of compute nodes 620) and not-structured data stored remotely (which may be accessible by not-structured data processing service 220), in one embodiment. Leader node 610 may also manage the communications among compute nodes 620 instructed to carry out database operations for data stored in the processing cluster 600, in one embodiment. For example, node-specific query instructions 614 may be generated or compiled code that is distributed by leader node 610 to various ones of the compute nodes 620 to carry out the steps needed to perform query 602, including executing the code to generate intermediate results of query 602 at individual compute nodes may be sent back to the leader node 610, in one embodiment. Leader node 610 may receive data and query responses or results from compute nodes 620 in order to determine a final result for query 602, in one embodiment. A database schema, data format and/or other metadata information for the data stored among the compute nodes, such as the data tables stored in the cluster, may be managed and stored by leader node 610 or obtained from data catalog service 240. Query planning 612, as discussed in more detail below with regard to FIG. 7, may account for remotely stored data by generating node-specific query instructions that include remote stateless operations to be directed by individual compute node(s), in one embodiment.

Processing cluster 600 may also include compute nodes, such as compute nodes 620a, 620b, and 620n. Compute nodes 620, may for example, be implemented on servers or other computing devices, such as those described below with regard to computer system 2000 in FIG. 13, and each may include individual query processing "slices" defined, for example, for each core of a server's multi-core processor, one or more query processing engine(s), such as query engine(s) 624a, 624b, and 624n, to execute the instructions 614 or otherwise perform the portions of the query plan assigned to the compute node, in one embodiment. Query engine(s) 624 may access a certain memory and disk space in order to process a portion of the workload for a query (or other database operation) that is sent to one or more of the compute nodes 620. Query engine 624 may access attached storage, such as 622a, 622b, and 622n, to perform local operation(s), such as local operations 618a, 618b, and 618n, in one embodiment. For example, query engine 624 may scan data in attached storage 622, access indexes, perform joins, semi joins, aggregations, or any other processing operation assigned to the compute node 620, in one embodiment.

Query engine 624a may also direct the execution of remote data processing operations, by providing remote operation(s), such as remote operations 616a, 616b, and 616n, to remote data processing clients, such as remote data processing client 626a, 626b, and 626n. Remote data processing clients 626 may be implemented by a client library, plugin, driver or other component that sends request operations, such as request operation(s) 632a, 632b, and 632n to non-structure data processing service 220. Operations requests 632 may be self-describing, identifying the particular portion of data to which the operation is to be applied, in one embodiment. In at least some embodiments requested operation(s) 632 may include a partition identifier for the not-structured distributed data set specifying the partition upon which the operation is to be performed. The operation may be the operations identified for not-structured data processing in the generated query execution plan by leader node 610.

As noted above, in some embodiments, non-structure data processing service 220 may implement a common network endpoint to which request operation(s) 632 are directed, and then may dispatch the requests to respective processing nodes, such as processing nodes 640a, 640b, and 640n. Processing nodes 640 may implement stateless request processing in one embodiment, such that no communication between processing nodes is shared in order to complete a requested operation. If a processing node 640 fails, remote data processing client 626 may retry the request that failed (which may be directed to another processing node that has no state or progress information for the failed attempt). In at least some embodiments, processing nodes 640 may access metadata stored along with the data object in the data storage service to check whether the operation will return any results out the data object. For example, range values for a timestamp may be used as an index to check whether any data objects in a partition have a timestamp value within a range specified by the operation. If not, then processing node 640 may return an empty result without accessing the assigned partition. Although a single processing node 640 is depicted as communicating with a compute node 620, in some embodiments, multiple processing nodes 640 may receive operations from a single compute node 620, so that processing operations for not-structured data may be highly parallelized. In at least some embodiments, an operation requests for each partition of a not-structured data set may be processed by a different processing node, which could initiate processing operations at a large number of nodes (e.g., 1,000 processing nodes 640) reporting results to a significantly smaller number of compute nodes 620 (e.g., 4 compute nodes). In this way, full-text searches and other compute intensive scans may be highly parallelized in order to achieve fast operation performance.

Processing nodes 640 may perform schema extraction techniques while performing an operation, in some embodiments, and provide determined schema information along with results 634 so that compute nodes 620 may be able to interpret the received results. In some embodiments, processing nodes 640 may implement late schema binding to apply schemas, extraction rules, and other information maintained for the not-structured data set from data catalog service (or from compute nodes 620 as part of request operations 632) on top of data objects stored in a raw format. For example, processing node 640 may apply extraction rules to retrieve data values requested in operations 632 or apply transformation rules to change retrieved data into a format understandable by compute node 620 prior to sending the transformed data back as results 634.

Remote data processing clients 626 may read, process, or otherwise obtain results from processing nodes 640, including partial or complete results of different operations (e.g., full text search operations, query predicate evaluations, or other features typically provided for querying over structured data that are applied by processing nodes 640), such as results 634a, 634b, and 634n. In some embodiments, processing nodes 640 may extract data values for results 634 by apply extraction or retrieval rules to obtain data values from data objects in storage. As part of performing the requested operations 632, processing nodes 640 may perform late schema-binding, using updated or modified schema information provided by data catalog and may provide them back to query engine(s) 624, which may further process, combine, and or include them with results of location operations 618. Compute nodes 620 may send intermediate or final results from queries back to leader node 610 for final result generation (e.g., combining, aggregating, modifying, joining, etc.) Remote data processing clients 626 may retry operation request(s) 632 that do not return within a retry threshold. As format independent data processing service 220 may be stateless, processing operation failures at processing node(s) 640 may not be recovered or taken over by other processing nodes 640, remote data processing clients 626 may track the success or failure of requested operation(s) 632, and perform retries when needed.

Attached storage 622 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 7:
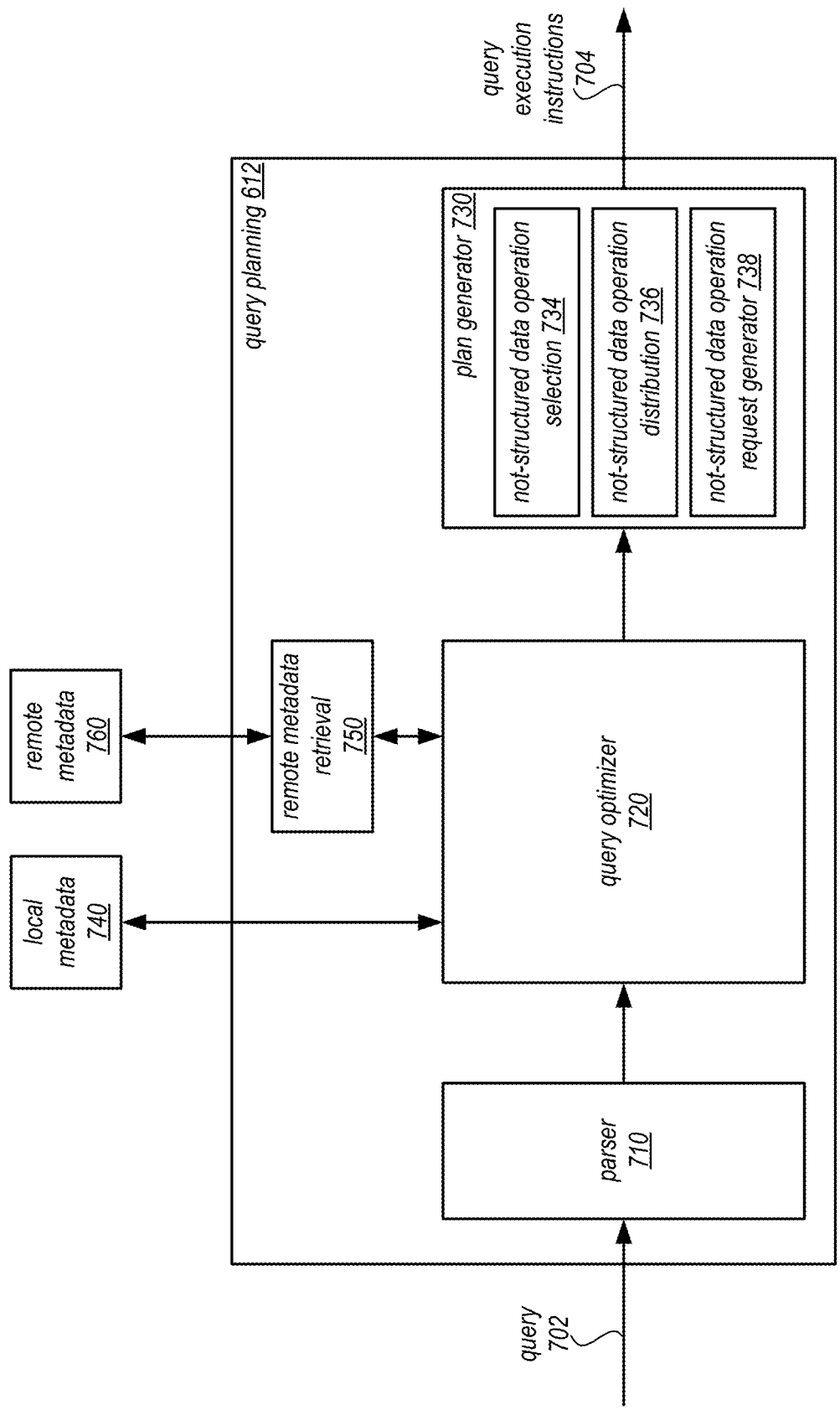
FIG. 7 is a logical block diagram illustrating an example query planning engine that generates query plans for performing tiered data processing, according to some embodiments.

FIG. 7 is a logical block diagram illustrating an example query planning engine that generates query plans for performing tiered data processing, according to some embodiments. Query planning 712 may implement parser 710 to receive a query statement, such as a SQL statement, and determine the various requested operations to perform as a result of the query. For example, parser 710 may generate a query tree for a given query input string to separate out the various query clauses, fields, predicates, conditions, commands, or other query information for planning and optimization. Query planning 712 may implement query optimizer 720 to rewrite the parsed query based on metadata that describes both the local data and remote data. For example, as illustrated in FIG. 7, query optimizer 720 may have access to local metadata 740 (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

As portions of query 702 may be directed to remote data that is not-structured, query optimizer 720 may rely upon metadata describing the remote data, such as remote metadata 760 (e.g., data source types, data types of fields, extraction rules, transformation rules, storage information mapping (e.g., number and locations of partitions), number of data objects, number of distinct values, value ranges, value cardinality, value distribution, indexes, views, etc.), to perform query rewrites to optimize execution of portions of the query with respect to remotely stored data. While a client of the processing cluster could provide remote metadata 760 (e.g., as query hints), in some embodiments query planning 712 may implement remote metadata retrieval 750 which may request remote metadata 760 from different sources.

For example, remote metadata may be stored as part of an external data catalog service, data catalog service 240. When parser 710 parses query 702, a check may be performed to see if metadata for the referenced data in query 702 is found in local metadata. If not, remote metadata retrieval 750 may send a request to a remote data source, such as a metadata service or another service storing the remote data (e.g., to a database service or object storage service storing the data). In some embodiments, query 702 may include references to remote data according to a default schema name that may allow for the check in local metadata 740 to be skipped and a request for remote metadata 760 sent. Query optimizer 720 may perform similar rewrite operations as discussed above with respect to stateless operations or portions of the parsed query to be executed remotely at not-structured data processing 220, such as changing the location or ordering of predicates, join operations, or other portions or operations in the query tree.

The optimized query plan may then be provided to plan generator 730. Plan generator 730 may perform various operations to generate a query execution plan (e.g., a tree of plan operation nodes, which may be later used to generate query execution code). For example, plan generator may perform a cost-based optimization to select one of various combinations or orderings of plan operator nodes in a tree produces a least costly plan to execute. Plan generator 730 may also implement not-structured data operation selection, which may use local 740 or remote 760 metadata to determine what operations to perform in order to satisfy the query (e.g., full text searches, predicates, or other conditions, etc.), in one embodiment. For example, not-structured data operation selection may receive a list of predicates as part of query 702 and along with a list of partitions (for local and/or remote data) along with range values or other information describing the values stored within the partitions (e.g., timestamp values). If an evaluation of a predicate compared with the range values or other value description information were to exclude that partition from satisfying the query predicate (e.g., timestamp values in the partition are out of a timestamp range for the query predicate), then operations to evaluate (e.g., scan) the partition may be removed, in one embodiment. In scenarios where the partitions removed are partitions of remote data, in addition to saving processing costs, removal of partitions would save transmission costs (e.g., network bandwidth) to move results from remote data.

Not-structured data operation selection 734 may apply various rules-based selection techniques for data included in the query that is identified as not-structured in order to determine which operations should be sent to not-structured data processing services. In some embodiments, modifications to a query plan may be implemented or performed dynamically based on intermediate results from previously executed portions of the query plan (e.g., with respect to local data). For example, conditional statements or other logical operators may be included in the query plan that indicate which operation to perform locally or direct remotely based on the intermediate results of previously performed operations.

As part of selection operations for remote processing, not-structured data operation selection 734 may modify the query plan to include data plan operation nodes that correspond to assigned operations. For example, not-structured operation selection 734 may insert a plan node that represents full text search operations or query predicate evaluations to be directed by a compute node (e.g., compute node 620) and performed at a processing node (e.g., processing node 640) part of a subquery for executing the query. This remote operation node in the plan may identify which operations are assigned for remote execution and may be annotated with a corresponding interface command to execute the operation remotely (e.g., a not-structured data processing service 220 API) as well as specific data that should be scanned (e.g., partition, file, or other data object identifiers), in one embodiment. The remote operation node may include predicates, regular expressions, sequential analysis, or other information for projections, filters, or limitations (e.g., a SQL limit clause) to be applied as part of the operation, in one embodiment. In addition to scan, other operations may include aggregation operations, group by operations, or any other operation that may be performed as if the remote data were structured data instead of not-structured data.

Plan generator 730 may implement not-structured data operation distribution 736 to determine which compute nodes may direct (e.g., request and process returned results) not-structured data processing operations. For example, in at least some embodiments a round-robin distribution scheme may be implemented to ensure that each compute node handles fair share of remote data processing workload. Distribution schemes may account for the number of data objects to be evaluated or the size of data objects to be evaluated when distributing not-structured data processing operations.

Plan generator 738 may implement not-structured data operation request generator 738. In some embodiments, not-structured data request generator 738 may populate a template, message, request, or other data structure for directing remote data processing operations. A remote data processing client, such as remote data processing clients 626 in FIG. 6, may interpret, access, or utilize the data structure to send remote data processing requests to not-structured data processing service 220 to perform stateless operations, in one embodiment. In some embodiments, plan generator 730 may generate query execution code or other execution instructions 704 to perform the query plan. The query execution instructions 704 may access data structures generated for not-structured data operation requests to generate code for executing remote data processing operations, in some embodiments.

Figures 8A, 8B:
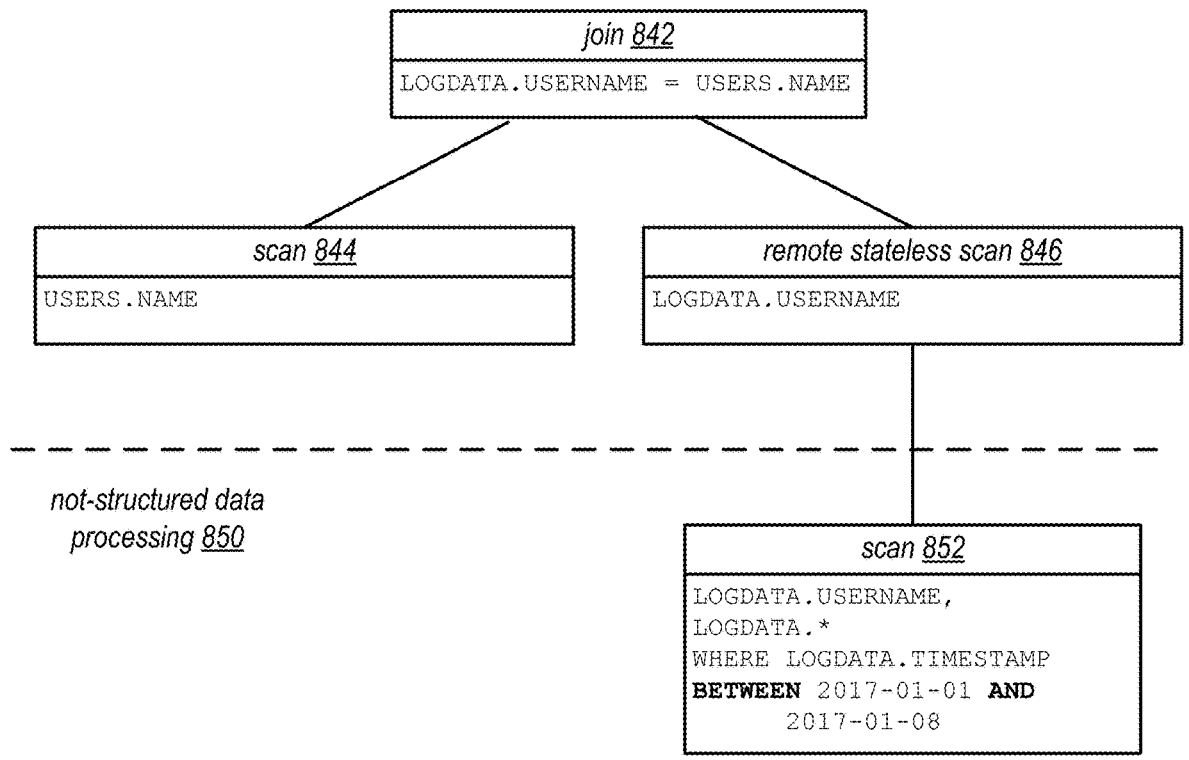
FIG. 8A illustrates an example query directed to both structured data and not-structured data, according to some embodiments.
FIG. 8B illustrates an example query plan generated for processing the query directed to both structured data and not-structured data, according to some embodiments.

FIG. 8A illustrates an example query directed to both structured data and not-structured data, according to some embodiments. Query 810 may be directed to both structured data and not-structured data. For example, not-structured data 820 may be LOGDATA, which may be stored in a separate storage service, such as storage service 230. Structured data 830, may be users table stored in a data warehouse service, such as data warehouse service 300. The query may join values from structured data 830 and not-structured data 820, as at least some schema for not-structured data may be known (e.g., username and timestamp fields), as may be extracted during ingestion as discussed above with regard to FIG. 5.

FIG. 8B illustrates an example query plan generated for processing the query directed to both structured data and not-structured data, according to some embodiments. For example, the query execution plan may include operations for structured data processing 840 and not-structured data processing 850. Join operation 842 and scan operation 844 may be performed using local data and computation resources (e.g., of a compute node 620 in FIG. 6). A remote operation plan node, such as remote stateless scan operation 846 may point to a remote stateless operation to be performed for not-structured data by not-structured data processing service 220. Scan operation 852 may be provided as a set of scan operations issued as requests to each partition that stores LOGDATA. In some embodiments, the partition may not be scanned if, based on metadata for the partition, it can be determined that no data object within the partition has a timestamp between the dates of 2017-01-01 and 2017-01-08. A null result could be returned without scanning, saving execution time and cost. As other data associated with LOGDATA may be unknown, the wildcard "*" may be used to retrieve the data. The execution of the query plan may treat the unknown data for each object in LOGDATA as a data blob, providing it in results "as is" without any formatting. The results of executing the query plan may be returned to a user according to a structured data format (e.g., in table format), in one embodiment. Please note that the scan operation is just one example of a stateless operation that can be generated and performed at a remote query processing engines, like processing nodes 420 implemented as part of not-structured data processing service 220. Other operations may include predicate evaluation, regular expression text searches, sequential analysis, projections, filters, limitations (e.g., a SQL limit clause), aggregation operations, group by operations, or any other data operations.

Although FIGS. 2-8B have been described and illustrated in the context of a provider network implementing different data processing services, like a data warehousing service 300, the various components illustrated and described in FIGS. 2-8B may be easily applied to other data processing systems that process structured data and not-structured data on behalf of clients. As such, FIGS. 2-8B are not intended to be limiting as to other embodiments of processing structured data and not-structured data at a same query engine.

Figure 9:
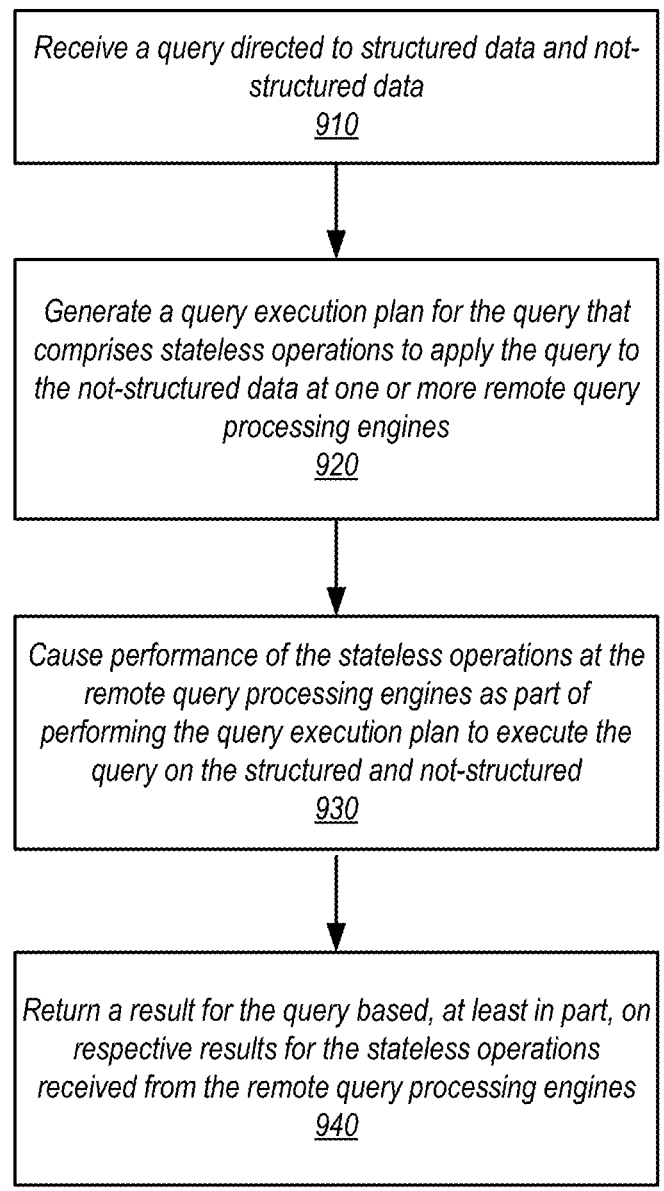
FIG. 9 is a high-level flowchart illustrating methods and techniques to execute a query directed to both structured data and not-structured data, according to some embodiments.

FIG. 9 is a high-level flowchart illustrating methods and techniques to execute a query directed to both structured data and not-structured data, according to some embodiments. Various different systems and devices may implement the various methods and techniques described below, either singly or working together. For example, a processing cluster, such as described above with regard to FIG. 6, may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 910, a query directed to structured data and not-structured data may be received, in various embodiments. For example, a query engine may provide an interface that supports SQL queries and may receive via the interface a SQL query directed to structured data and not-structured data. The SQL query may include a hint, in some embodiments, designation which data is not-structured, while in other embodiments, the query engine may be able to determine which data is not-structured.

As indicated at 920, a query execution plan for the query may be generated that includes stateless operations to apply the query at one or more remote query processing engines, in some embodiments. For example, as discussed above with regard to FIG. 8B, different processing operations may be performed to execute a query, including scans, predicate evaluation, regular expression text searches, sequential analysis, projections, filters, limitations (e.g., a SQL limit clause), aggregation operations, or group by operations, in some embodiments. These stateless operations may be statelessly performed by the remote query engines so that each operation is performed independent from other operations in the query plan, in one embodiment. In this way, state for the operations does not have to be preserved across operations in the remote query processing engines (although state for the operations may be preserved at a query engine, like a data warehouse cluster in FIG. 3 which is processing the entire query), in some embodiments. In at least some embodiments, different stateless operations may be removed from the query execution plan after determining that a partition or the not-structured data to which the stateless operation applies does not include data that would satisfy the query (e.g., because the data in the partition includes data with timestamp values within a certain range of time that is not included in the range of time specified in the query). Query execution plans may be generated according to the various techniques discussed above, including different cost optimization selections. In some embodiments, schema information for not-structured data (e.g., obtained during ingestion) may be used to generate the query execution plan (e.g., by defining some fields or data values that may be expected in not-structured data).

As indicated at 930, performance of the stateless operations may be caused at the remote query processing engines as part of executing the query execution plan. For example, requests formatted according to an API for the remote query processing engines may be sent that include individual operations to perform. Other operations for structured data may also be performed, as discussed above with regard to FIG. 6.

As indicated at 940, a result for the SQL query may be returned, in various embodiments, based at least in part on respective results for the stateless operations received from the remote query processing engines. For example, although some of the data to which the query is applied was not-structured, the result format may conform to a structured data format (e.g., a table format). In some embodiments, the result may be generated based on the results of operations specific to the not-structured data performed at remote query engine(s), as discussed above and below with regard to FIG. 10.

Figure 10:
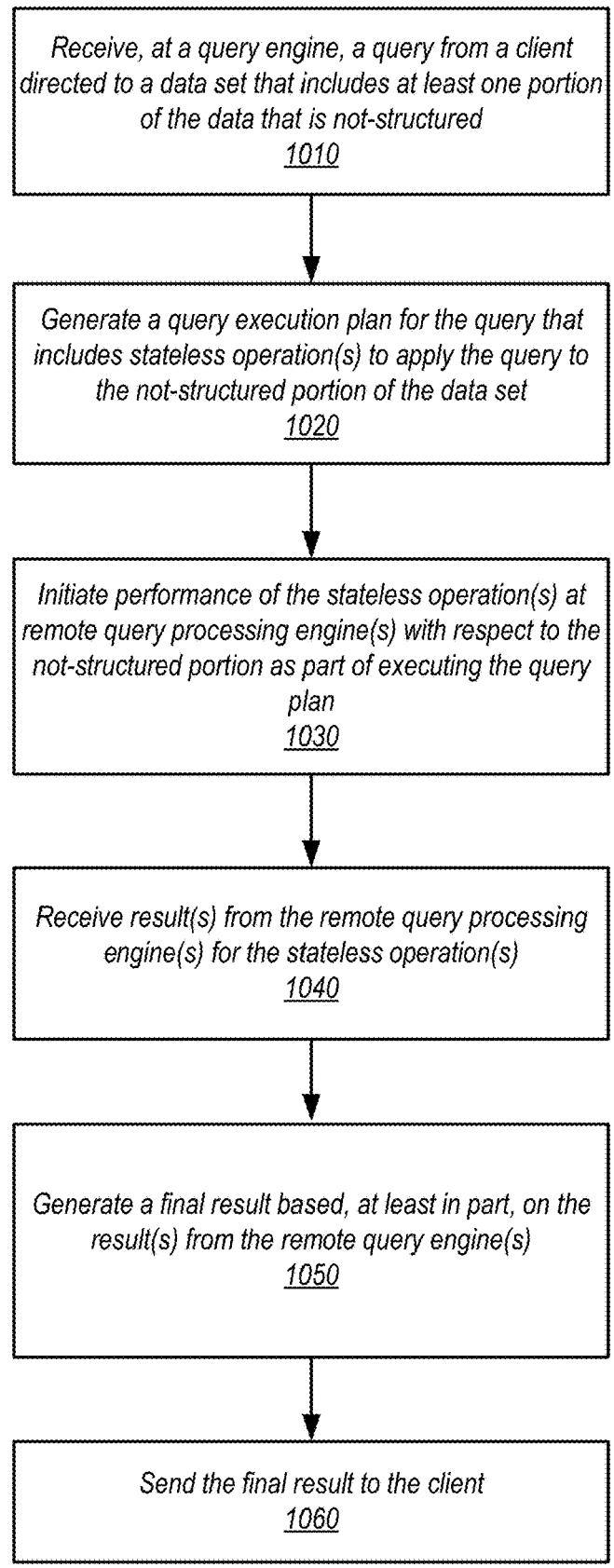
FIG. 10 is a high-level flowchart illustrating methods and techniques to generate a query execution plan at a query engine to apply a query to not-structured data at one or more remote query engines, according to some embodiments.

FIG. 10 is a high-level flowchart illustrating methods and techniques to generate a query execution plan at a query engine to apply a query to not-structured data at one or more remote query engines, according to some embodiments. As indicated at 1010, a query may be received at a query engine directed to a data set that includes at least one portion of the data set that is not-structured. For example, the data set may indicate multiple data objects, a table, and another data object that may include non-structure data, such as log including multiple log records, in one embodiment.

As indicated at 1020, a query execution plan may be generated for the query that include(s) stateless operations to apply the query to the not-structured portion of the data set, in one embodiment. Local or remote metadata (from a metadata store like data catalog service 240) may be evaluated to determine what operations to perform in order to satisfy the query (e.g., full text searches, predicates, or other conditions, etc.), in one embodiment. For example, not-structured data operations may be included in the query execution plan by reviewing a list of predicates for the query, identifying those predicates applicable to not-structured data, and identifying those data objects of not-structured data to be evaluated (e.g., partitions). The same operations that may be performed locally (e.g., SQL-based query plan operations) may be selected and performed for the not-structured data portion, in some embodiments.

As indicated at 1030, performance of the operation(s) may be initiated at one or more remote query processing engine(s) with respect to the not-structured portion as part of executing the query plan, in some embodiments. For example, the query engine may begin performing local operations according to the query plan and upon reaching a remote operation, send one or more requests to complete the remote operation to a remote query engine (or engines), such as processing nodes 640 in not-structured data processing service 220 in FIG. 2 above. The query engine may, in some embodiments, continue performing local operations until results for the remote operations are needed to continue executing in accordance with the query execution plan.

As indicated at 1040, result(s) from the remote query processing engine(s) may be received from the remote query processing engine(s) for the stateless operation(s). For example, the results of scan operations, filter operations, join operations, group by operations, select operations, etc., performed remotely may be incorporated with the results of location operations (as discussed above with regard to FIGS. 8A and 8B), in one embodiment. A final result for the query may be generated, based, at least in part, on the result(s) from the remote query engine(s), as indicated at 1050, in some embodiments. The generated final results may then be sent in response to the query, as indicated at 1060.

Figure 11:
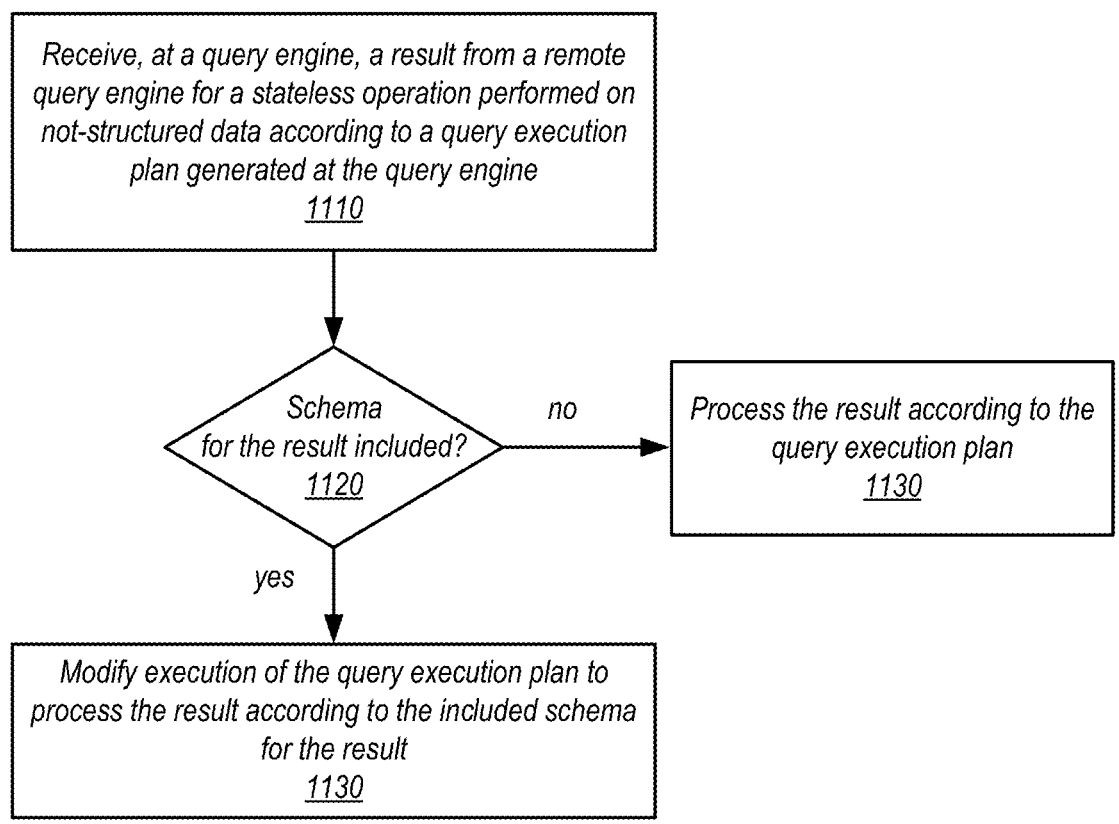
FIG. 11 is a high-level flowchart illustrating methods and techniques to perform late schema binding on a schema and results received from a remote query engine, according to some embodiments.

FIG. 11 is a high-level flowchart illustrating methods and techniques to perform late schema binding on a schema and results received from a remote query engine, according to some embodiments. As indicated at 1110, a result from a remote query engine may be received at a query engine for an operation performed on not-structured data according to a query execution plan generated at the query engine, in various embodiments. For example, as discussed above with regard to FIGS. 6 and 9, results for different operations may be used to generate a final result for a query. In some embodiments, the remote query engine may be able to determine a schema for some part of the results sent back for the operation. For example, the remote query engine may recognize a data type for an item, such as an integer, string, date, uniform resource locator, etc., and report back the schema definition for the result along with the result. If, as indicated by the positive exit from 1120, schema is included for the result of the operation, then execution of the query execution plan may be modified to process the results according to the included schema for the result, in various embodiments. For example, instead of treating received results as unreadable bits, the query engine can treat them as integers (according to the received schema), which can increase the speed and efficiency at which the operation results are used in executing the query. If, as indicated by the negative exit from 1120, no schema information is included, then the result may be processed according to the query execution plan, as indicated at 1130, as it currently exists, in various embodiments (e.g., treating the data as unknown).

Figure 12:
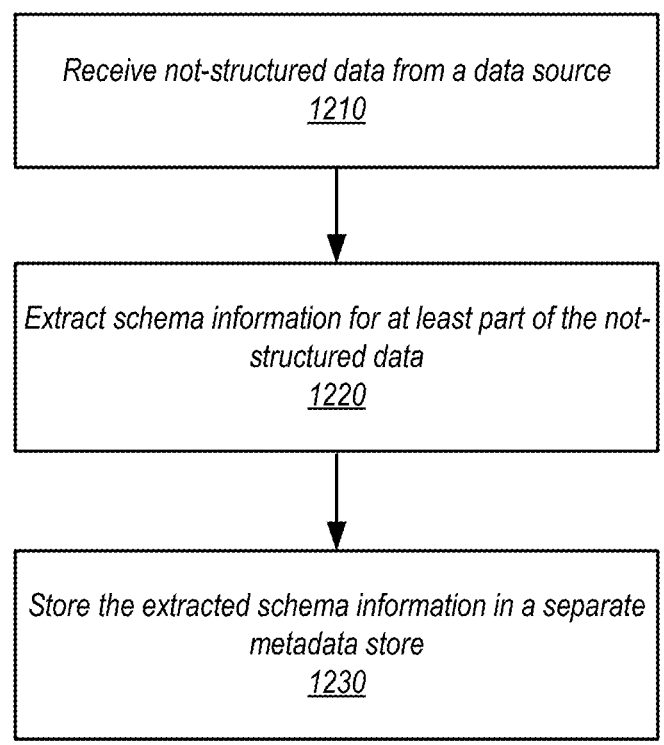
FIG. 12 is a high-level flowchart illustrating methods and techniques to ingest data that is not structured for processing, according to some embodiments.

FIG. 12 is a high-level flowchart illustrating methods and techniques to ingest data that is not structured for processing, according to some embodiments. Data, including not-structured data, may be received from different data sources, in one embodiment. In at least some embodiments, the not-structured data may be ingested and processed as it is stored to perform query execution upon the not-structured data. As indicated at 1210, non-structured data may be received from a data source, as remote system generating a stream of data that is stored, transported, and provided to a connector or other ingestion endpoint (e.g., at an ingestion node 440 as discussed above in FIG. 4).

In some embodiments, schema information may be extracted for at least part of the not-structured data, as indicated at 1220. For example, schema extraction may recognize data source types, a timestamp, data types, columns, fields, or other locations within data objects that may conform to a schema, in one embodiment. Schema extraction may generate extraction or retrieval rules to remove data from the data object according to the extracted schema information (e.g., where in the data object a particular field is located) and/or may provide or generate an index based on information extracted for data objects (e.g., based on timestamp values determined for each data object), in some embodiments.

As indicated at 1230, the extracted schema information may be stored in a separate metadata store, in some embodiments. The metadata store may be separate from the data store that stores the not-structured data, such as data catalog service 240 discussed above.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of executing queries for structured and not-structured data as described herein may be executed on one or more computer systems, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a query on structured data and not-structured data at a query engine, wherein the structured data is stored according to a pre-defined data model and the not-structured data is not stored according to a pre-defined data model;
generate, by the query engine, a query execution plan for the query that comprises:
one or more stateful operations to apply the query to the structured data; and
stateless operations to apply the query to the not-structured data at one or more remote query processing engines;
send, by the query engine, the stateless operations to the remote query processing engines as part of performing the query execution plan to execute the query on the structured data and not-structured data; and
generate, by the query engine, a result for the query based, at least in part, on:
respective results for the stateless operations received from the remote query processing engines; and
respective results for the stateful operations to apply the query to the structured data; and
return, by the query engine the result for the query.

2. The system of claim 1, wherein the stateless operations are sent to the remote query processing engines according to a programmatic interface for the query processing engines.

3. The system of claim 2, wherein the query engine is implemented as a part of a leader node of a cluster of compute nodes, wherein the leader node provides instructions to one or more compute nodes of the cluster to send the stateless operations to the remote query processing engines, and wherein the leader node receives the respective results as part of other results generated by the one or more compute nodes in order to generate the result for the second query.

4. The system of claim 2, wherein the query engine is implemented as part of a network-based data warehouse service, wherein the not-structured data is a log comprising a plurality of records stored in a network-based data storage service, wherein the remote query engines are implemented as part of a not-structured data processing service, and wherein the data warehouse service, data storage service and not-structured data processing service are implemented as part of a provider network.

5. A method, comprising:
receiving a query on structured data and not-structured data, wherein the structured data is stored according to a pre-defined data model and the not-structured data is not stored according to a pre-defined data model;
generating a query execution plan for the query that comprises:
one or more stateful operations to apply the query to the structured data; and
stateless operations to apply the query to the not-structured data at one or more remote query processing engines;
causing performance of the stateless operations at the remote query processing engines as part of performing the query execution plan to execute the query on the structured data and not-structured data; and
returning a result for the query based, at least in part, on:
respective results for the stateless operations received from the remote query processing engines; and
respective results for the stateful operations to apply the query to the structured data.

6. The method of claim 5, wherein causing performance of the stateless operations at the remote query processing engines as part of performing the query execution plan to execute the query on the structured data and not-structured data comprises sending the stateless operations to the remote query processing engines according to a programmatic interface for the remote query processing engines.

7. The method of claim 6, wherein causing performance of the stateless operations at the remote query processing engines comprises sending a respective operation to a different remote query engine for one or more partitions of the not-structured data.

8. The method of claim 6, wherein returning the result for the query comprises:
determining that schema information for at least one of the respective results is received from the remote query processing engines along with the respective results; and
modifying execution of the query execution plan with respect to the at least one respective result according to the received schema information.

9. The method of claim 5,
wherein the not-structured data is a log comprising a plurality of log records;
wherein the method further comprises:
receiving the log from a data source;
storing log records of the log into different partitions in a remote data store according to a partitioning scheme; and
wherein causing performance of the stateless operations at the remote query processing engines comprises accessing, by the remote query processing engines, the remote data store to separately apply the query to one or more of the partitions.

10. The method of claim 9, wherein generating the query execution plan for the query that comprises:
determining that at least one of the partitions does not satisfy the query; and
removing a stateless operation from the query execution plan to apply the query to the at least one partition.

11. The method of claim 5, further comprising:
receiving the not-structured data from a data source;
extracting schema information for at least part of the not-structured data;
storing the extracted schema information in a separate metadata store; and
wherein generating the query execution plan for the query is based, at least in part, on the extracted schema information for the not-structured data.

12. The method of claim 5, wherein the query is performed in response to a data event detected for the not-structured data.

13. The method of claim 5, wherein the receiving, the generating, the causing, and the returning are performed by a query engine that is implemented as part of a network-based data warehouse service, wherein the not-structured data is stored in a network-based data storage service, and wherein the data warehouse service and the data storage service are implemented as part of a same provider network.

14. A non-transitory, computer-readable storage medium, storing program instructions that when executed by one or more computing devices cause the one or more computing devices to implement:
receiving a query on structured data and not-structured data, wherein the structured data is stored according to a pre-defined data model and the not-structured data is not stored according to a pre-defined data model;
generating a query execution plan for the query that comprises:
one or more stateful operations to apply the query to the structured data; and
stateless operations to apply the query to the not-structured data at one or more remote query processing engines;
causing performance of the stateless operations at the remote query processing engines as part of performing the query execution plan to execute the query on the structured data and not-structured data; and
returning a result for the query based, at least in part, on:
respective results for the stateless operations received from the remote query processing engines; and
respective results for the stateful operations to apply the query to the structured data.

15. The non-transitory, computer-readable storage medium of claim 14, wherein, in causing performance of the stateless operations at the remote query processing engines as part of performing the query execution plan to execute the query on the structured data and not-structured data, the program instructions cause sending the stateless operations to the remote query processing engines according to a programmatic interface for the remote query processing engines.

16. The non-transitory, computer-readable storage medium of claim 15, wherein, in returning the result for the query, the program instructions cause the one or more computing devices to implement:
determining that schema information for at least one of the respective results is received from the remote query processing engines along with the respective results; and
modifying execution of the query execution plan to the at least one respective result according to the received schema information.

17. The non-transitory, computer-readable storage medium of claim 14,
wherein the program instructions cause the one or more computing devices to further implement:
receiving the not-structured data from a data source;
storing data objects of the not-structured into different partitions in a remote data store according to a partitioning scheme; and
wherein, in causing performance of the stateless operations at the remote query processing engines, the program instructions cause the one or more computing devices to implement accessing, by the remote query processing engines, the remote data store to separately apply the query to one or more of the partitions.

18. The non-transitory, computer-readable storage medium of claim 17, wherein the program instructions cause the one or more computing devices to further implement:
extracting schema information for at least part of the not-structured data;
storing the extracted schema information in a separate metadata store; and
wherein generating the query execution plan for the query is based, at least in part, on the extracted schema information for the not-structured data.

19. The non-transitory, computer-readable storage medium of claim 14, wherein the structured data is a relational database table and wherein the not-structured data is log comprising a plurality of log records.

20. The non-transitory, computer-readable storage medium of claim 14, wherein the one or more computing devices implement a query engine as part of a network-based structured data processing service, wherein the not-structured data is stored in a network-based data storage service, and wherein the structured data processing service and the data storage service are implemented as part of a same provider network.

* * * * *